United States Patent [19]

Oyanagi et al.

[11] Patent Number: 5,076,882
[45] Date of Patent: Dec. 31, 1991

[54] SHAPING APPARATUS FOR A SYNCHRONIZER RING

[75] Inventors: Tomiya Oyanagi, Odawara; Yutaka Ota, Chigasaki, both of Japan

[73] Assignee: NSK Warner K.K., Tokyo, Japan

[21] Appl. No.: 485,760

[22] Filed: Feb. 26, 1990

Related U.S. Application Data

[63] Continuation of Ser. No. 284,894, Dec. 15, 1988, abandoned.

[30] Foreign Application Priority Data

Dec. 26, 1987 [JP] Japan .................. 62-328417

[51] Int. Cl.⁵ .............................................. B32B 31/14
[52] U.S. Cl. .................. 156/500; 192/53 F;
    192/107 M; 192/113 R; 192/113 B; 425/417
[58] Field of Search .............. 425/384, 385, 394, 398,
    425/410, 416, 417, 419, 423, 500, 517, 520, 521;
    156/500, 245; 192/53 F, 107 M, 113 R, 113 B

[56] References Cited

U.S. PATENT DOCUMENTS

| | | | |
|---|---|---|---|
| 2,954,853 | 10/1960 | Maierson et al. | 192/107 M |
| 4,267,912 | 5/1981 | Bauer et al. | 192/53 F |
| 4,286,694 | 9/1981 | Wiseman et al. | 192/107 M |
| 4,597,484 | 7/1986 | Takiguchi et al. | 192/53 F |
| 4,770,283 | 9/1988 | Putz et al. | 192/53 F |
| 4,824,357 | 4/1989 | Christiansen | 425/417 |

Primary Examiner—Caleb Weston
Attorney, Agent, or Firm—Shapiro and Shapiro

[57] ABSTRACT

A synchronizer ring has a frictional material and oil grooves extending on the frictional surface of the frictional material in a longitudinal direction and a circumferential direction, and in the oil grooves, the fiber layer of the frictional material is substantially continuous. The oil grooves are formed simultaneously by a shaping apparatus including an arrangement of longitudinal and circumferential groove punches which are simultaneously forced outwardly from a punch holder by a cooperative slide member which reciprocates within the punch holder.

2 Claims, 8 Drawing Sheets

SHAPING APPARATUS FOR A SYNCHRONIZER RING

This is a continuation of application Ser. No. 284,894 filed Dec. 15, 1988, now abandoned.

BACKGROUND OF THE INVENTION

1. Field of the Invention

This invention relates to a synchronizer ring in a manual transmission for an automotive vehicle or in a synchronizing device for a synchronous meshing type speed change gear mounted in a machine for construction or agriculture, and a shaping apparatus and a shaping method therefor, and in particular to a synchronizer ring with a frictional material having oil grooves, and a shaping apparatus and a shaping method therefor.

2. Related Background Art

There have heretofore been proposed various synchronizing devices of the inertia lock type having a synchronizer ring with a frictional material such as a porous frictional material provided on the frictional surface thereof.

Where a frictional material is thus used, lubricating oil such as transmission oil is not quickly eliminated from the frictional surface during the shift operation, and this has led to the problem that undersynchro is liable to occur. Therefore, devices have been proposed using a synchronizer ring having a plurality of oil grooves formed on the frictional surface by machining such as cut-machining after the frictional material is bonded to the frictional surface.

For example, FIGS. 1 to 3 of the accompanying drawings show a prior art structure of the type just described, wherein a synchronizer ring 20 has a frictional material 21 bonded thereto and the inner surface thereof forms a frictional surface. On the frictional surface of the frictional material 21, a plurality of longitudinal grooves 22 and two circumferential grooves 23 are formed as oil grooves. In the case of this example, the longitudinal grooves 22 are formed by a hot pressure molding method or the like simultaneously with or after the bonding of the frictional material 1, and the circumferential grooves 23 are thereafter formed by a cutting tool by the use of a lathe.

However, the formation of oil grooves by such a process poses the following problems.

Since the circumferential grooves 23 are formed by cut-machining, the machined shape is not stable due to the irregularity of the then fixed position with respect to the lathe or the like, the irregularity of the machining work, etc., and this has sometimes led to abnormality of the cross-sectional shape such as machining burr or machining crack. Also, in the machined cross-section, as seen in FIG. 3, the fiber layer of the frictional material 21 is exposed and becomes discontinuous.

Accordingly, during use when the frictional material 21 is subject to an input having two components, i.e., a compression force and a shearing force, the frictional material 21 causes concentration of stress in the machined cross-section thereof, and this leads to premature exfoliation of the fiber layer and poor service life.

Also, this machining work is often carried out manually in another step after the pressure molding and therefore, has reduced production efficiency and has complicated quality control, and further has made it difficult to make low cost products.

SUMMARY OF THE INVENTION

It is an object of the present invention to provide a synchronizer ring with a frictional material formed with oil grooves which is free of the problems as noted above, and to provide a shaping apparatus and a shaping method therefor which are excellent in production efficiency.

The synchronizer ring according to the present invention has a frictional material and oil grooves extending on the frictional surface of the frictional material in a longitudinal direction and a circumferential direction, and is characterized in that in the oil grooves, the fiber layer of the frictional material is substantially continuous.

The shaping apparatus for a synchronizer ring according to the present invention has synchronizer ring carrying means for carrying thereon a synchronizer ring on which a frictional material is set at a predetermined position, pressurizing means movable relative to the synchronizer ring carrying means, and heating means for normally heating the synchronizer ring carrying means and the pressurizing means, and is characterized in that the pressurizing means has a pressurizing member, an intermediate member selectively movable relative to the pressurizing member, an oil groove forming means adapted to effect a relative movement coincident with that of the intermediate member, relative to the pressurizing member, and to press the entire frictional material against the synchronizer ring when the intermediate member is stationary relative to the pressurizing member, and to move transversely to the direction of said relative movement when the intermediate member moves relative to the pressurizing member, thereby forming a plurality of oil grooves on the frictional surface of the frictional material in the longitudinal direction and the circumferential direction of the synchronizer ring, and biasing means for normally biasing the oil groove forming means in opposition to said transverse movement.

The shaping method for a synchronizer ring with a frictional material according to the present invention is characterized by the step of setting a frictional material on the synchronizer ring, a first pressuring step of heating and bonding the entire frictional material to the synchronizer ring, and a second pressurizing step of forming oil grooves on the frictional surface of the heated and bonded frictional material simultaneously in the longitudinal direction and the circumferential direction of the synchronizer ring.

DESCRIPTION OF THE PREFERRED EMBODIMENTS

Figure 1:
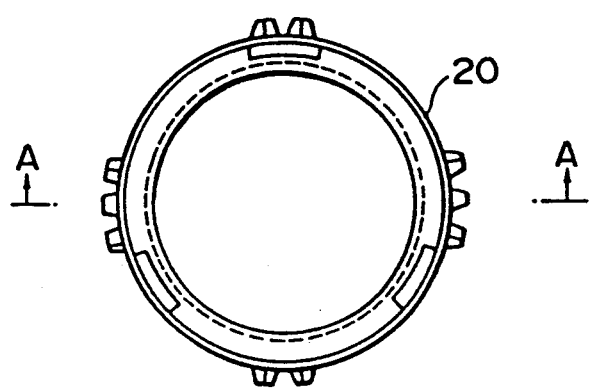
FIG. 1 is a top plan view showing a synchronizer ring according to the prior art.

A synchronizer ring with a frictional material according to the present invention and a shaping apparatus and a shaping method therefor will hereinafter be described with respect to embodiments thereof shown in the drawings.

Figure 5:
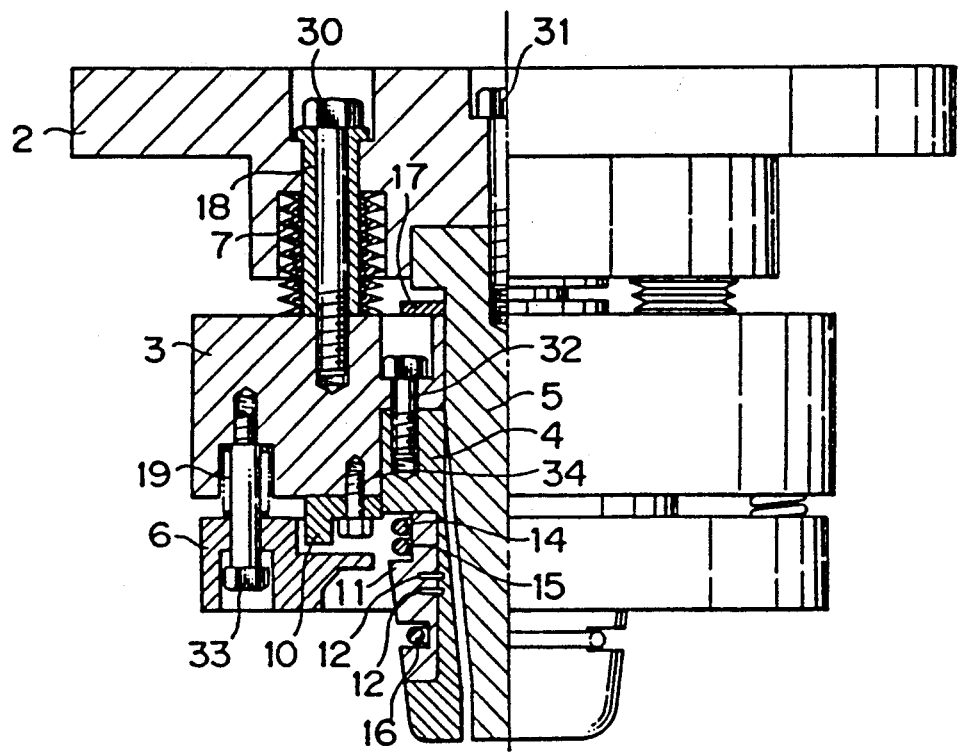
FIG. 5 is a cross-sectional view showing principal portions of the pressurizing means of a shaping apparatus for the synchronizer ring of the present invention.
Figure 7:
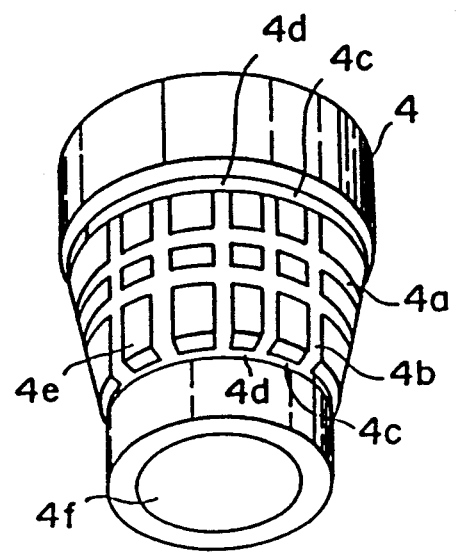
FIG. 7 is a diagrammatic perspective view showing the punch retainer of the shaping apparatus for the synchronizer ring of the present invention.
Figure 8A:
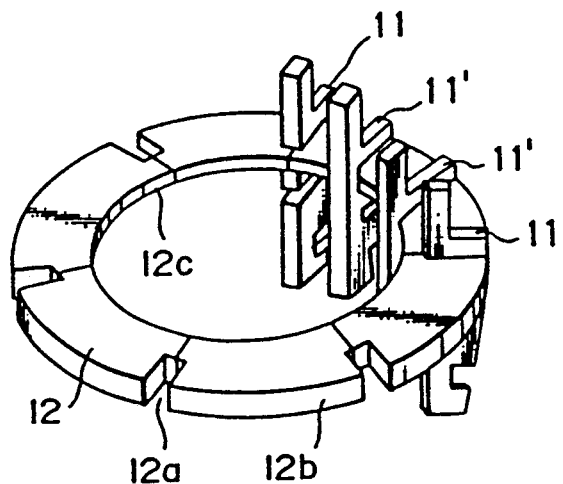
FIG. 8A is a perspective view illustrating the assembly of the groove punches of the shaping apparatus for the synchronizer ring of the present invention.
Figure 8B:
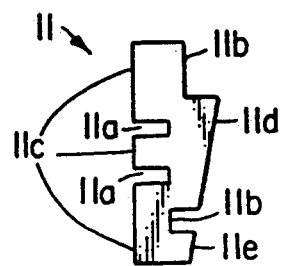
FIG. 8B is a side view showing the longitudinal groove punch for return of the shaping apparatus for the synchronizer ring of the present invention.
Figure 8C:
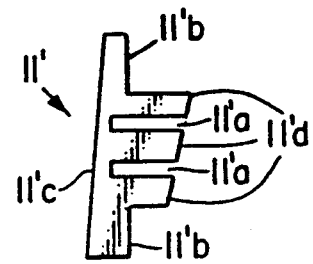
FIG. 8C is a side view showing the longitudinal groove punch for protrusion of the shaping apparatus for the synchronizer ring of the present invention.

FIG. 5 is a front view (a cross-sectional view of principal portions) showing the pressuring means of a shaping apparatus according to the present invention. An upper die 2 has a slide punch 5 attached thereto by a bolt 31. A punch holder 3 is attached to the upper die 2 by a bolt 30, and is installed through a collar 18 and a counter-sunk spring 7 so as to assume a predetermined initial state having a predetermined clearance relative to the upper die 2. The slide punch 5 is inserted in the central portion of the punch holder 3 through a clearance adjusting member 17 so as to have a predetermined clearance relative to the upper die 2, and is movable relative to the punch holder 3, which slides on the inner surface thereof. A punch retainer 4 is attached to the central portion of the punch holder 3 by a bolt 32 so as to be coaxial with the slide punch 5, and the slide punch 5 is also movable relative to the punch retainer 4 while sliding on the inner surface thereof. Longitudinal groove punches 11 and 11' and a pair of circumferential groove punches 12 are contained in the punch retainer 4. The arrangement of the longitudinal groove punches (only one punch 11 of which is seen in FIG. 5) will be better appreciated from FIGS. 8A to 8C, to be discussed shortly. When the slide punch 5 moves relative to the punch holder 3 and the punch retainer 4 while sliding on the inner surfaces thereof, the longitudinal groove punches 11 and 11' and the circumferential groove punches 12 are pushed out at the same time in a direction substantially orthogonal to the direction of movement of the slide punch 5 and thus protrude from the outer surface of the punch retainer 4. In the present embodiment, as shown in FIGS. 8A to 8C, each circumferential groove punch 12 (only one of which has been depicted in FIG. 8A in order to simplify the drawing) comprises a piece divided into six equal shapes, and cut-aways 12a are formed in the joined portions thereof. The longitudinal groove punches 11' and 11 are respectively designed to facilitate protrusion and return of the punches from and to the retainer 4. Each longitudinal groove punch 11' (one of which is shown in FIG. 8C) is fitted into the circumferential groove punches 12 from inside with the aid of recesses 11'a, and a total of twelve such longitudinal groove punches 11' are set on the circumferential groove punches 12, two being set on each of the six equally divided pieces of the respective circumferential groove punches 12. When punches 11' are set, outer surface portions 11'd thereof are flush with the outer surface 12b of each circumferential groove punch 12 and inner surfaces 11'c thereof protrude inwardly with respect to the inner surface 12c of each circumferential groove punch 12. Each longitudinal groove punch 11 (one of which is shown in FIG. 8B) is fitted into respective recesses 12a of the circumferential groove punches 12 from outside with the aid of recesses 11a, and a total of six such longitudinal groove punches 11 are set on the circumferential groove punches 12. When punches 11 are set, first outer surface portions 11d thereof are flush with the outer surface 12b of each circumferential groove punch 12 and inner surfaces 11c thereof do not reach the inner surface 12c of each circumferential groove punch 12. Also, when punches 11 are set, second outer surface portions 11b of the longitudinal groove punches 11 are set so as to be positioned more adjacent to outer surfaces 12b of the circumferential groove punches 12 than to second outer surface portions 11'b of the longitudinal groove punches 11'. In the process in which they are set, the circumferential groove punches 12 and the longitudinal groove punches 11 and 11' are respectively introduced into circumferential grooves 4a or longitudinal grooves 4b of the punch retainer 4 shown in FIG. 7, and are mounted so as to be flush with the outer surface 4e of the punch retainer 4. Winding portions 4c for winding coil springs 14 to 16 are formed with respective cut-away portions 4d, and when the circumferential groove punches 12 and the longitudinal groove punches 11 and 11' are mounted, only the second outer surface portions 11b of the longitudinal groove punches 11 are exposed at the cut-away portions 4d and are flush with the outer surface of the winding portions 4c. Also, the inner surfaces 11'c of the longitudinal groove punches 11' protrude more inwardly than the inner surface 4f of the punch retainer 4. Accordingly, when the slide punch moves relative to the punch holder 3 and the punch retainer 4 and comes down to the punch retainer 4 side (the lower side as viewed in FIG. 5), the outer surface of the slide punch slidingly bears against the inner surfaces 11'c of the longitudinal groove punches 11' and thus pushes the punches 11' out in a direction substantially orthogonal to the direction of movement. The outward movement of punches 11' in turn causes outward movement of circumferential punches 12 and longitudinal groove punches 11, such that the outer surface portions 11d, 11'd and 12b protrude outwardly from the outer surface 4e of the punch retainer 4, and the second outer surface portions 11b of the longitudinal groove punches 11 protrude outwardly from the winding portion 4c while resisting the biasing forces of the coil springs 14 to 16. A stripper 6 is mounted below the punch holder 3 for relative movement by a bolt 33 with a predetermined clearance with respect to the punch holder 3, and is normally biased downwardly by a stripper spring 19 so as to be parallel to the punch holder 3. A caliber adjusting member 10 is attached to the punch holder 3 by a bolt 34 to ensure more accurate and more positive attachment of the punch retainer 4 to the punch holder 3.

Figure 6:
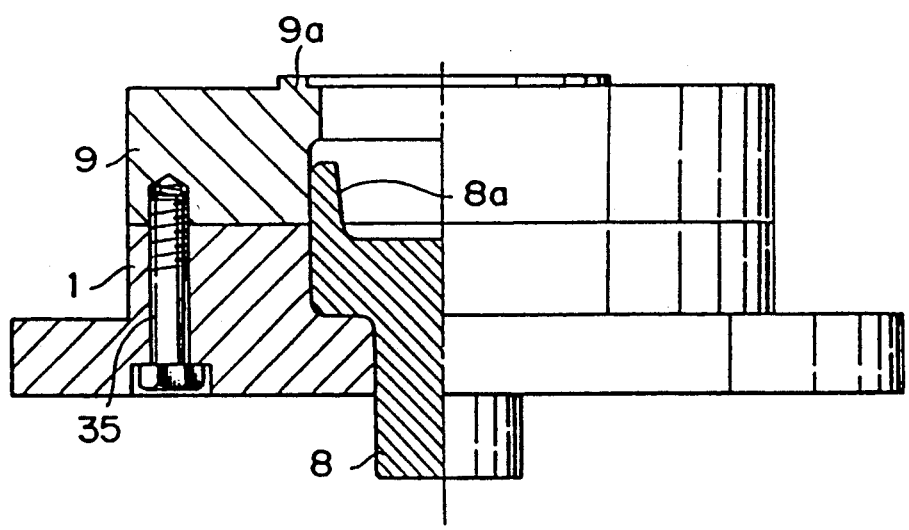
FIG. 6 is a cross-sectional view showing principal portions of the synchronizer ring carrying means of the shaping apparatus for the synchronizer ring of the present invention.

FIG. 6 is a front view (a cross-sectional view of principal portions) showing the synchronizer ring carrying means of the shaping apparatus according to the present invention. A synchronizer ring carrying bed 9 is mounted on a lower die 1 by means of a bolt 35. A groove punch returning member 8 is mounted in the central portion of the lower die 1 and the synchronizer ring carrying bed 9 for movement relative to them while sliding. The groove punch returning member 8 is for slidingly bearing against the lower outer surface portions 11b of groove punches 11 to thereby forcibly push the groove punches back into the punch retainer. This will ensure return of the punches in the possible event that the biasing forces of the coil springs 14 to 16 acting on the groove punches 11, 11' and 12 through the second outer surface portions 11b of the longitudinal groove punches 11 are insufficient to effect the return. (It is possible, for example, that the volatile component of the adhesive agent and the gas of the frictional material will adhere to the longitudinal grooves 4b or the circumferential grooves 4a of the punch retainer 4 and to the sliding portions of the longitudinal groove punches 11 and 11' or the circumferential groove punches 12, causing binding of the punches in a protruded state.) The synchronizer ring carrying bed 9 is formed with a projection 9a for carrying a synchronizer ring thereon and determining the position thereof.

The actual operation of the shaping apparatus according to the present invention and the specific shaping method will hereinafter be described on the basis of the above described construction.

Figure 9:
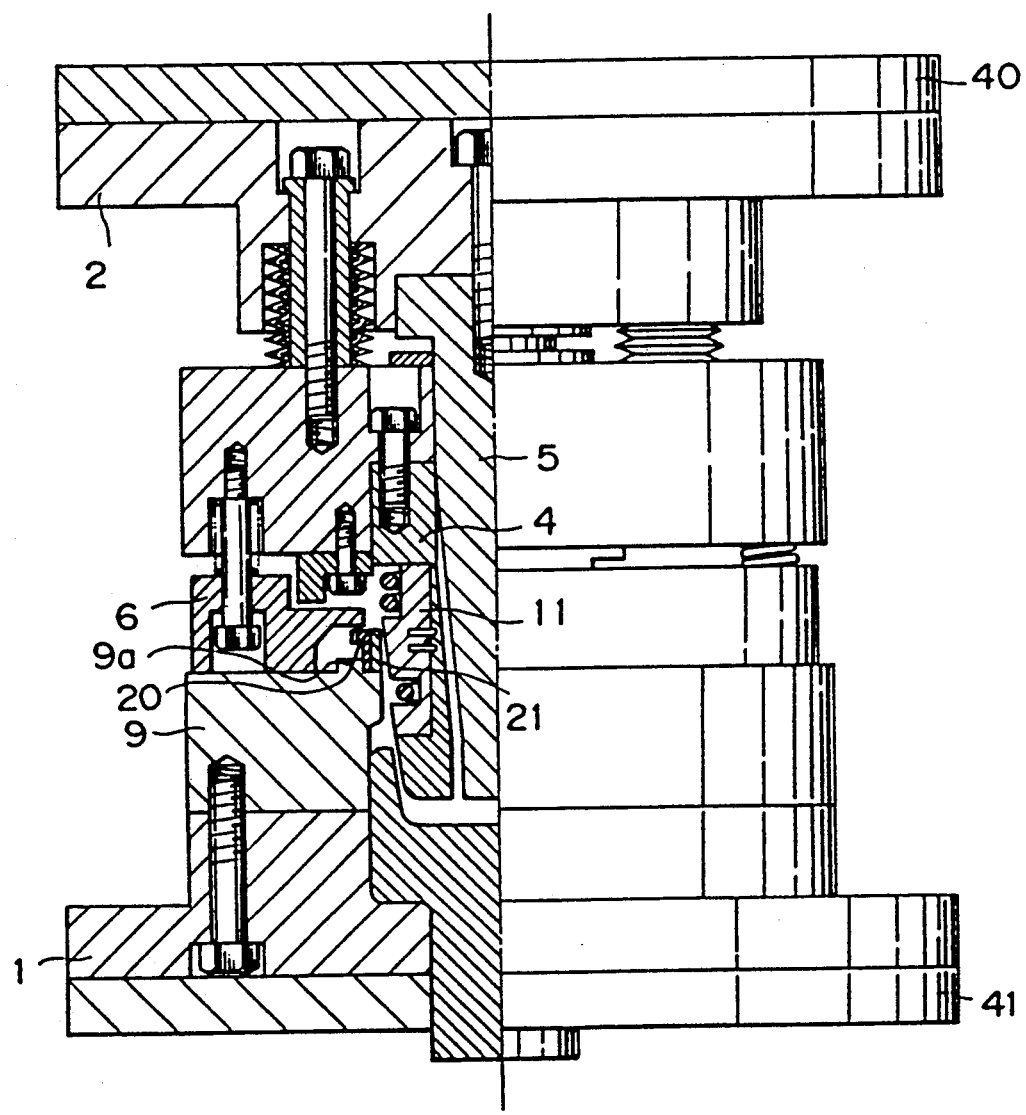
FIG. 9 is a cross-sectional view of principal portions of the shaping apparatus for the synchronizer ring of the present invention.

The pressurizing means shown in FIG. 5 and the synchronizer ring carrying means shown in FIG. 6 are mounted on the upper mold and the lower mold, respectively, of a press machine, not shown, and at the same time, an upper heater 40 and a lower heater 41 are installed as shown in FIG. 9, whereby the press machine is normally heated to a predetermined temperature. Before the upper mold of the press machine is lowered, the synchronizer ring 20 having a predetermined porous frictional material 21 set thereon is surrounded by the projection 9a of the synchronizer ring carrying bed 9 and the stripper 6 and positioned, and then is carried on the synchronizer ring carrying bed 9. The upper mold is lowered until the underside of the punch holder 3 bears against the upper surface of the synchronizer ring carrying bed 9 while the relative position of the upper mold and the lower mold is being guided by means such as a positioning pin, not shown. FIG. 9 shows this state.

Figure 10:
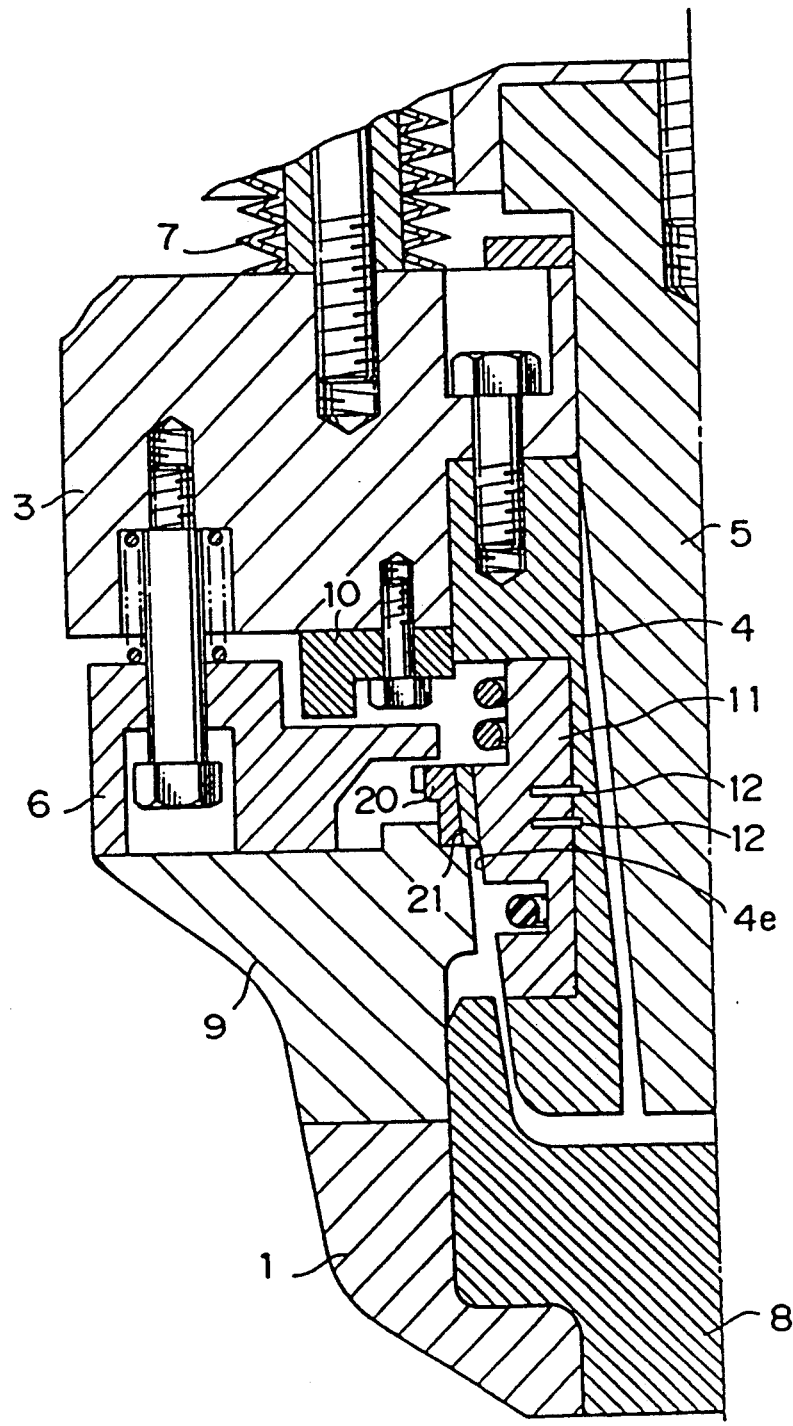
FIG. 10 is an enlarged cross-sectional view of principal portions showing the pre-pressure condition of the shaping apparatus for the synchronizer ring of the present invention.
Figure 10A:
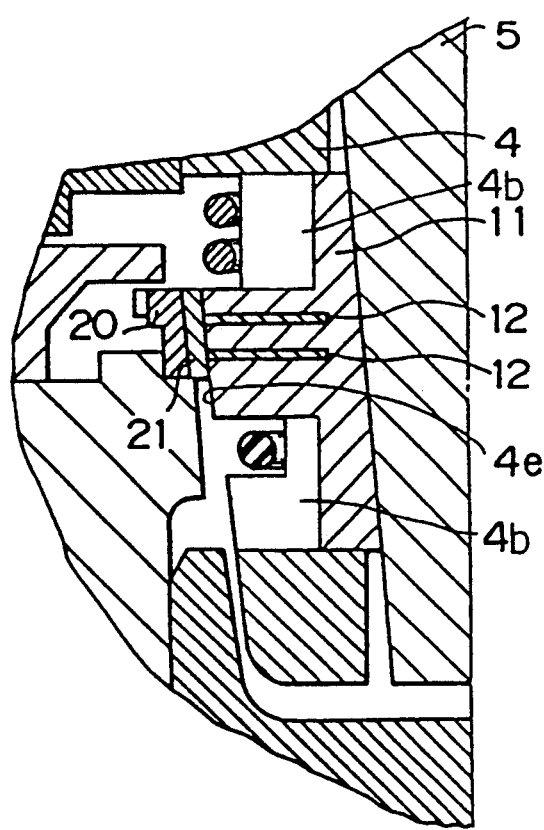
FIG. 10A is a fragmentary cross-sectional view also showing the pre-pressure condition, but as viewed in a different axial plane through the shaping apparatus than in FIG. 10.

FIG. 10 is an enlarged cross-sectional view of principal portions showing the pre-pressure condition in the first pressurizing step. The upper mold of the press machine is further lowered, but since the spring constant of the counter-sunk spring 7 is set so that the counter-sunk spring 7 is not yet contracted by the pressing force, the punch retainer 4 and the slide punch 5 do not move relative to each other, but lower as a unit toward the lower mold. Accordingly, the outer surface portions 11d, 11'd and 12a of the longitudinal groove punches 11, 11' and the circumferential groove punches 12, respectively, do not protrude from the outer surface 4e of the punch retainer 4 and they together push the inner surface of the frictional material 21 outwardly, whereupon the frictional material 21 is heated and bonded to the synchronizer ring 20. Also, at this time, there is still clearance or the like separating both the punch holder 3 and the caliber adjusting member 10 from the stripper 6. FIG. 10A shows the pre-pressure condition in an axial section taken through one of the punches 11'.

Figure 2:
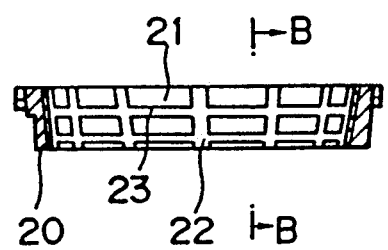
FIG. 2 is a cross-sectional view taken along line A—A of FIG. 1.
Figure 3:
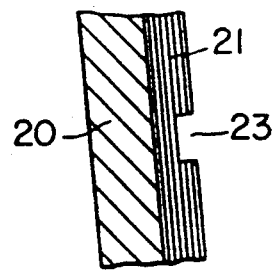
FIG. 3 is an enlarged fragmentary cross-sectional view taken along line B—B of FIG. 2.
Figure 4:
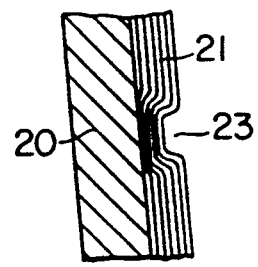
FIG. 4 is an enlarged fragmentary cross-sectional view showing the synchronizer ring of the present invention and corresponding to FIG. 3.
Figure 11:
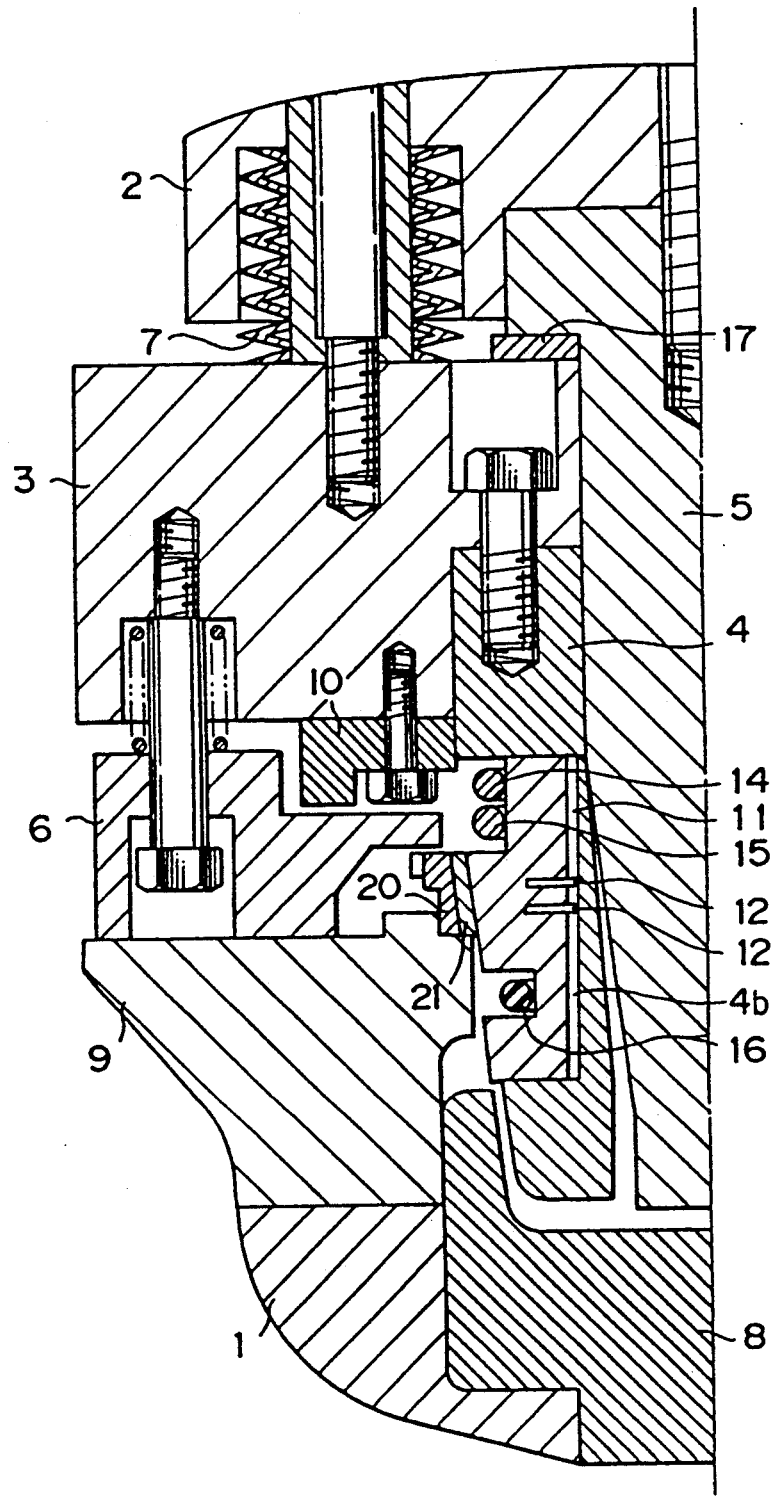
FIG. 11 is an enlarged cross-sectional view of principal portions showing the main pressure condition of the shaping apparatus for the synchronizer ring of the present invention.

FIG. 11 is an enlarged cross-sectional view of principal portions showing the main pressure condition in the second pressurizing step. In contrast with the pre-pressure condition, the upper mold of the press machine is further lowered and therefore, the counter-sunk spring 7 begins to be contracted, and the slide punch 5 begins to move relative to the punch holder 3 and the punch retainer 4. The outer surface of the slide punch 5 then begins to slide while bearing against the inner surfaces 11'c of the longitudinal groove punches 11' for protrusion, and thus begins to push out the longitudinal groove punches 11 and 11' and the circumferential groove punches 12 in a direction substantially orthogonal to the direction of movement of the slide punch. The outer surface portions 11d, 11'd and 12b protrude outwardly from the outer surface 4e of the punch retainer 4 and they are pressed into the frictional surface of the frictional material 21, whereby a plurality of longitudinal grooves 22 and circumferential grooves 23 as shown in FIG. 2 can be formed simultaneously. As a result, the cross-sectional shape at each groove portion has a continuous fiber layer, as shown in FIG. 4. The second pressurizing step is completed after the slide punch 5 lowers and bears against the clearance adjusting member 17 and is stopped and thereafter holds that state for a predetermined time. Also, this step may be carried out at room temperature, instead of using the heaters 40 and 41.

Figure 12:
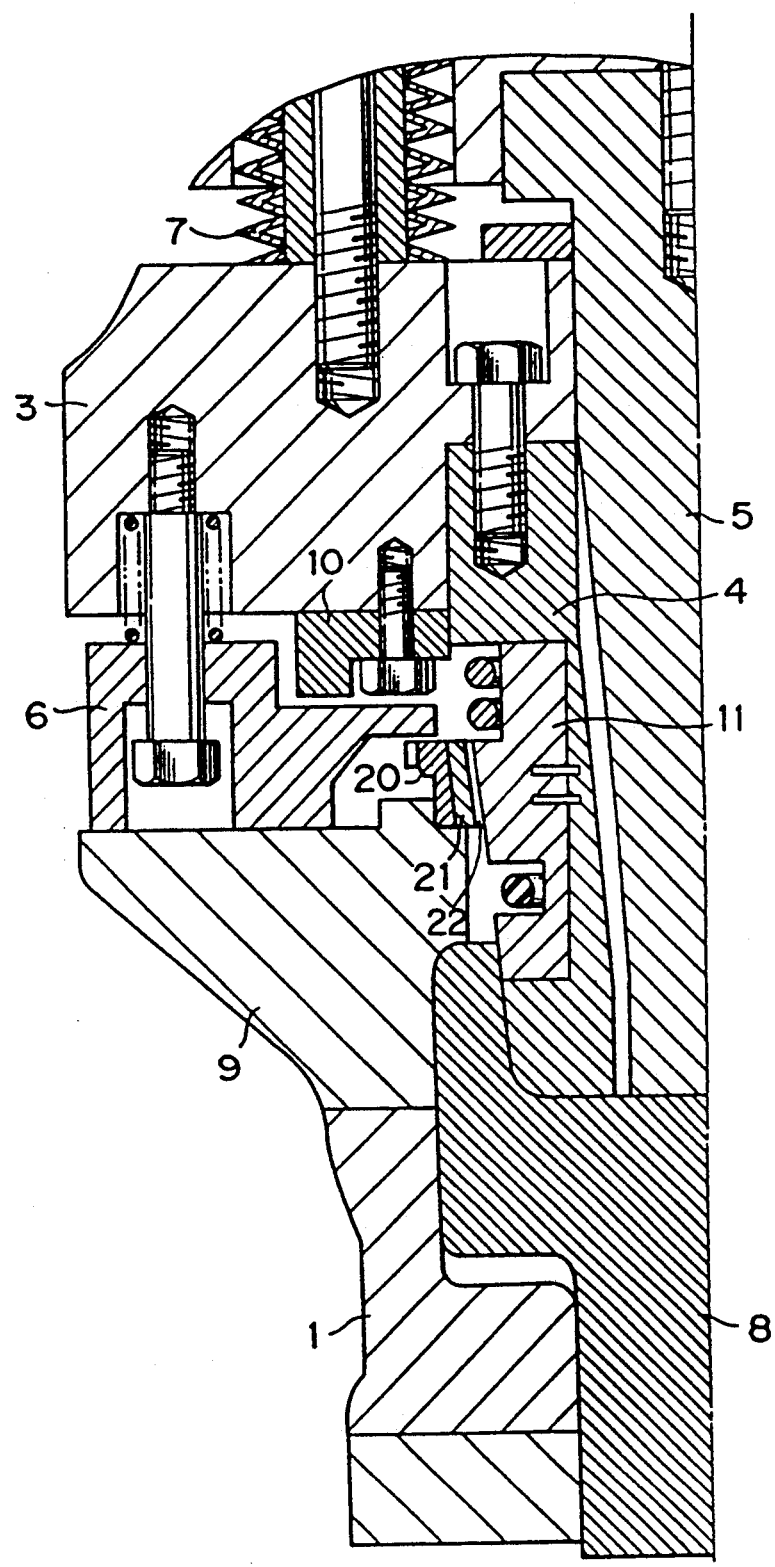
FIG. 12 is an enlarged cross-sectional view of principal portions showing the operating condition of the groove punch returning member of the shaping apparatus for the synchronizer ring of the present invention.

After the second pressurizing step has been completed, the upward lifting of the slide punch 5 is started and, when the relative positional relation between the punch holder 3, the punch retainer 4 and the slide punch 5 becomes equal to the relation held in the pre-pressure condition, the lifting is stopped. At this time, the biasing forces of coil springs 14 to 16 act through the second outer surface portions 11b of the longitudinal groove punches 11 for return so as to pull the protruded longitudinal groove punches 11, 11' and circumferential groove punches 12 back into the punch retainer and return them to their pre-pressure condition positions. As previously described, there is conceivable a case where the force of springs 14 to 16 is not sufficient to return the groove punches into the punch retainer 4. In order to assure the return of the groove punches, the groove punch returning member 8 is elevated by a pressure source such as an air compressor, not shown. At that time, the groove punch returning member 8 slidingly bears against third outer surface portions 11e of punches 11 and begins to forcibly return the groove punches 11, and thus also the punches 11' and 12 into the punch retainer 4. The groove punch returning member 8 is then elevated by a predetermined distance to push the groove punches 11, 11' and 12 reliably back into the punch retainer 4. FIG. 12 shows this state. Thereafter, the groove punch returning member 8 begins to lower and at the same time, the punch holder 3, the punch retainer 4 and the slide punch 5 begin to move up as a unit and return to their state shown in FIG. 9, whereby there can be obtained a synchronizer ring 20 in which the heating and bonding of the frictional material 21 and the formation of oil grooves have been completed. The upper mold is further moved up, the synchronizer ring 20 is interchanged and a similar process is again repeated, whereby synchronizer rings according to the present invention can be readily formed one after another. In the present embodiment, the direction of movement of the groove punches 11, 11' and 12 relative to the punch retainer 4 is a direction substantially orthogonal to the direction of movement of the slide punch 5. Alternatively, design may be made such that variations in the shape, etc. of the synchronizer ring dictate movement of the groove punches in a second direction not substantially orthogonal to the direction of movement of the slide punch.

In the present invention, when the synchronizer ring 20 and the frictional material 21 are to be heated and bonded together, an adhesive agent may be applied to the synchronizer ring 20 or may be contained in the frictional material 21.

Also, in the present invention, it is possible to employ a modified design in which the slide punch 5 can slide while bearing against the collective inner surfaces of the longitudinal groove punches 11, 11' and the circumferential groove punches 12 to thereby cause them to protrude from the punch retainer 4, or in which the slide punch can slide while bearing against only the circumferential groove punches 12. However, when the slide punch is arranged to slide while bearing against the collective inner surfaces of the groove punches 11, 11' and 12, the slide punch may sometimes slide while bearing against one member alone due to the irregularity or the like of the punch assembly as a whole, and this may lead to non-uniformity of the pressing force and the pressed shape or to a reduced service life of the punches. Also, when the slide punch is arranged to slide while bearing against only the inner surfaces of the circumferential groove punches 12, the area subjected to the pressurizing force is small and therefore, it becomes necessary to make the strength of assembly to the punch retainer 4 and the longitudinal groove punches 11 and 11' considerably great. By contrast, if, as in the present embodiment, the longitudinal groove punches 11' for protrusion are set and design is made such that the slide punch slides on the inner surfaces 11'c thereof, greater reliability will be provided.

Further, it has been confirmed that in the synchronizer ring with a porous frictional member having the cross-sectional structure of the groove portion shown in FIG. 4, the fiber layer is not exposed in the cross-section and remains continuous, wherefore durability is improved. For example, it has been confirmed in a continuous vibration test in which an input of a predetermined mode is applied to the frictional surface of the frictional material, that the life until overall exfoliation of the fiber layer occurs is improved by about 50%.

By the above-described construction, there is achieved a synchronizer ring with a frictional material which is improved in durability. At the same time, there are provided a shaping apparatus and a shaping method for a synchronizer ring with a frictional material which are excellent in production efficiency and low in cost.

What is claimed is:

1. A shaping apparatus for a synchronizer ring having:
   synchronizer ring carrying means for carrying thereon a synchronizer ring on which a frictional material is set at a predetermined position;
   pressurizing means movable relative to said synchronizer ring carrying means; and
   heating means for heating said synchronizer ring carrying means and said pressurizing means;
   wherein said pressurizing means is provided with a pressurizing member, an intermediate member selectively movable in a predetermined direction relative to said pressurizing member, and oil groove forming means adapted to effect a relative movement with respect to said pressurizing member coincident with that of said intermediate member, to press, together with said intermediate member, the entire frictional material against said synchronizer ring when said intermediate member is stationary relative to said pressurizing member, and to move transversely to said predetermined direction when said intermediate member moves relative to said pressurizing member and thereby form oil grooves in the frictional surface of said frictional material in the longitudinal direction and the circumferential direction of said synchronizer ring; and
   biasing means for normally biasing said oil groove forming means so as to oppose said transverse movement thereof and hold said oil groove forming means in a predetermined non-groove-forming position relative to said intermediate member.

2. A shaping apparatus according to claim 1, including means movable into engagement with said oil groove forming means for forcibly pushing said oil groove forming means to said predetermined position.

* * * * *